United States Patent Office 3,586,630

Patented June 22, 1971

3,586,630

STABILIZATION OF CHROMIUM DIOXIDE BY ORGANOPHOSPHORUS COMPOUNDS

Henry Gilbert Ingersoll, Hockessin, Del., assignor to E. I. du Pont de Nemours and Company, Wilmington, Del.

No Drawing. Filed May 8, 1969, Ser. No. 823,137
Int. Cl. H01f *1/28*
U.S. Cl. 252—62.54 10 Claims

ABSTRACT OF THE DISCLOSURE

Organophosphorous compounds taken from the group consisting of phosphines, phosphine oxides, and phosphorus esters, wherein no —OH group is atttached directly to a P atom, admixed in stabilizing amounts with $CrO_2$ particles and incorporated with a polymer binder thereby retarding loss of residual intrinsic flux density in magnetic recording members containing the ferromagnetic $CrO_2$ compositions.

BACKGROUND OF THE INVENTION

Field of the invention

This invention relates to magnetic recording members, e.g., magnetic tapes, and particularly to recording members containing ferromagnetic chromium dioxides as the magnetic material and to compositions from which the members are made.

Description of the prior art

The preparation of ferromagnetic chromium dioxide and the use of this material to make magnetic recording members has been described in a number of patents, among which may be mentioned U.S. Patents 2,885,365; 2,923,683; 2,923,684; 2,923,685; 2,956,955; 3,080,319; 3,117,093 and 3,278,263. Chromium dioxide prepared as described in these patents has excellent ferromagnetic properties. Magnetic recording members in which anisotropic chromium dioxide particles are highly oriented are especially suitable for storage of information.

The usefulness of any information storage system depends, of course, on its reliability, that is, on the certainty that all of the information stored in the system can be retrieved on demand, even after long periods of storage. Therefore, in a magnetic storage system, it is required that the magnetic characteristics of the recording member remain essentially unchanged over a protracted time under conventional storage conditions.

Ferromagnetic chromium dioxide in the form of dry powder is stable, can be stored for many years with no detectable change, and is unaffected by prolonged heating in dry air at temperatures below 300° C. However, it reacts slowly with water to form nonmagnetic materials, with the result that some of its desirable properties are diminished with age when it is stored in moist conditions such as are frequently present, for example, in magnetic tapes and other magnetic recording members. Moreover, the rate of degradation may be accelerated by certain organic materials present in the binder systems commonly used to provide mechanical strength in recording members.

For the highly desirable ferromagnetic properties of chromium dioxide to be used to full advantage in magnetic information storage systems having a high degree of long-term reliability, there is an apparent need for stabilizers that will permit the preparation of magnetic recording members that will not undergo loss of magnetic characteristics even when stored for long periods of time under extreme conditions of temperature and humidity.

SUMMARY OF THE INVENTION

This invention relates to a ferromagnetic chromium dioxide composition and layer comprising fine ferromagnetic chromium dioxide particles, a stabilizing amount of an organophosphorous compound in which there is no —OH group attached directly to a P atom, and an organic polymer binder, and to a process of making the same by admixing the first two ingredients and a solvent and then incorporating therewith an organic polymer binder. The magnetic recording elements of this invention, as compared with prior art magnetic recording elements, exhibit significantly enhanced stability of their magnetic characteristics when stored in hot, moist conditions; and are useful for various magnetic recording purposes, e.g., audio and video tapes, instrumentation and computer applications, and control equipment.

DESCRIPTION OF THE PREFERRED EMBODIMENTS

In making magnetic recording members according to this invention, any preformed ferromagnetic chromium dioxide may be used, but it is desirable to use a form having high coercivity and high remanent magnetization. Preferably, the chromium dioxide is in a single crystal, acicular form that possesses magnetocrystalline anisotropy with a unique axis of easy magnetization which coincides more or less with the acicular axis. The preparation of suitable forms of ferromagnetic chromium dioxide is described in U.S. Patents 2,885,365; 2,923,683; 2,923,684; 2,956,955; 3,034,988 and 3,278,263. Also suitable are chromium dioxides prepared as described in these patents then subjected to after-treatments such as the upgrading described in the assignee's copending application of Bottjer & Cox, S.N. 705,029, filed Feb. 13, 1968, U.S. Pat. 3,529,930, Sept. 22, 1970, and the stabilizing treatment described in assignee's copending application of Bottjer & Ingersoll, S.N. 732,109, filed May 27, 1968, now abandoned, but first refiled as S.N. 822,683, May 7, 1969, U.S. Pat. 3,512,930, May 19, 1970. Recording members can contain 1% to 98% and preferably 65%–75% by weight of fine, acicular, ferromagnetic chromium dioxide particles having the physical properties defined in the above-listed patents.

As the organic polymeric binder, there may be employed any of the commercially available polymers commonly used in preparing magnetic tapes and other magnetic recording members. Alternatively, the binder can be a polymer prepared by addition polymerization or condensation polymerization from commercially available monomers. Representative macromolecular, film-forming, organic polymer binding agents are polyurethanes, epoxides, polyvinyl derivatives, polyacrylic or polymethacrylic acids or esters thereof, polybutadiene, polycarbonates, cellulose esters, and mixtures of the polymers or copolymers of two or more of the vinyl or acrylic monomers. Those skilled in the art can readily select from the large number of available polymers those that will give the desired combination of such properties as strength, elasticity, surface uniformity, smoothness, and the like. One preferred material is a soluble preformed polyesterpolyurethane elastomer resin based on diphenylmethane diisocyanate, adipic acid, and an alkanediol having 2–4 carbon atoms. If desired, a binder of this kind may be hardened with such agents as polyfunctional isocyanates, e.g., 2,4-toluene diisocyanate/trimethylol propane (3/1), 4,4′-methylene-bis-(cyclohexylisocyanate), and the like. Other preferred binders are the commercially available copolymers of vinylidene chloride with acrylonitrile, and these may also be usefully combined with the polyester-polyurethane elastomer resin previously described. The binder will preferably comprise 25% to 35% by weight of the dry composition.

The composition may also include, as is common in the art, relatively minor quantities of such other ingredients as surface active agents, lubricants, and the like.

With the ferromagnetic chromium dioxide of such compositions, there is present, according to this invention, a stabilizing amount of an organophosphorus compound in which there is no —OH group attached to a P atom taken from the group consisting of phosphines, phosphine oxides and organic esters of phosphorus acids. This amount may be from less than 1% to 10% or more by weight of the total dry weight of the chromium dioxide in the composition. Illustrative of the organic phosphorus compounds that may be used are those of the formula $R_3P$, $R_3PO$, $(RO)_3P$, $(RO)_3PO$, $(RO)_2P(O)R'$, and $R_2P(O)(OM)$, where R and R′ are organic radicals, e.g., aryl, alkyl or polymeric chain, except that in compounds having multiple R groups attached directly to the P atom, at least one R may be hydrogen; and where M is a univalent metal, e.g., a sodium or potassium ion. Examples of suitable compounds are:

$R_3P$—triphenyl phosphine
$R_3PO$—triphenyl phosphine oxide
$(RO)_3P$—triphenyl phosphite, diphenyl decyl phosphite
$(RO)_3PO$—triphenyl phosphate
$(RO)_2P(O)R'$—dioctyl phenyl phosphonate
$R_2P(O)(OM)$—sodium benzene phosphinate It has been found that many of the phosphorus compounds useful as stabilizers in the present invention can serve effectively also as dispersing agents for the chromium dioxide in the binder systems. When these compounds are used, the dispersing agents which would otherwise commonly be employed can be omitted from the compositions. This is an additional advantage of the present invention, since some of the conventional dispersing agents have been shown to accelerate the degradation of magnetic properties of chromium dioxide in the presence of moisture.

The weights, parts and percentages of the various components are discussed in terms of the final dry magnetic composition, i.e., binder, chromium dioxide, stabilizer, lubricant, plus other ingredients, but the compositions are made from solutions or dispersions of the organic components, where it is not feasible to use a given component, e.g., the polymer binder, in its undissolved form. The solvent content of a given composition is, of course, evaporated in the course of putting the composition in the form of a useful magnetic recording member. The choice of solvent is not critical and is governed by the solubility characteristics of the binder or binders and other materials selected for the composition. Representative solvents for the polymer binders and phosphorus compounds are tetrahydrofuran, acetone, and methyl ethyl and methyl isobutyl ketones. Mixtures of two or more of such solvents can be used.

In preparing magnetic recording compositions according to this invention, the procedures described below may be employed. In a typical procedure, the preformed chromium dioxide, the organophosphorus stabilizer and a quantity of solvent are placed in a container together with an amount of Ottawa sand equal to 2–3 times the weight of the chromium dioxide. The container is closed and the ingredients are slurry-milled, for example, with the aid of a paint conditioner or shaker oscillating at about 700–1000 cycles per minute. There is then added a solution of the polymeric binder component(s) in an amount sufficient to give the desired proportion of binder in the final dry composition. After further milling or shaking, there may be additions of such other components as lubricants, cross-linking agents, and the like, and it will frequently be desirable that the additions be made as solutions of these various ingredients. When sufficient final mixing and milling have been carried out, the dispersion may be filtered to remove the sand, deaerated, and adjusted to desired final viscosity by addition of solvent.

The dispersions prepared in this way may be cast by conventional techniques to form self-supporting films which may serve as integral magnetic recording members. Alternatively, they may be coated, by means of a doctor knife adjusted to give a coating of the desired thickness, on any suitable base material to form supported magnetic recording members. Among the base materials that may be used are nonmagnetic metal sheets, plates, discs, drums, and the like, and previously prepared films, sheets, or tapes made from any of a number of organic polymeric materials having suitable characteristics of strength, dimensional stability, surface friction, and the like, all as well understood by those skilled in this art, e.g., films of cellulose acetate or of polyethylene terephthalate. In either case, i.e., supported or non-supported, the films or coatings are passed, before fully set, between opposing magnets having an orienting field strength sufficient to align the magnetic particles in parallel fashion. The films or coatings containing the oriented chromium dioxide particles are then allowed to dry at room or elevated temperature, and, when they contain cross-linking agents, to cure at temperatures and for periods of time sufficient to produce cross-linking of the polymers in the compositions. The resulting coatings or films are then aged under various conditions for testing their stability. When they are to be tested for magnetic properties, they may first be calendered at elevated temperature and pressure, the exact temperature and pressure varying with the particular composition of the coating and the base (if any). If the members are to be aged before testing, they will, of course, be stored for the desired length of time in an environment where the desired conditions of temperature and humidity are maintained.

The stability of the magnetic characteristics of a magnetic recording member can be determined by measurement of residual intrinsic flux density (or remanent flux), $\phi_r$, of a 0.5-inch-wide sample of the member when fresh and again after aging. This property is measured on a DC ballistic-type magnetometer which is a modified form of the apparatus described by Davis and Hartenheim in *Review of Scientific Instruments*, 7, 147 (1936). Changes in $\phi_r$ are expressed as the time in days required for a loss of 10% of the initial $\phi_r$. This loss in residual intrinsic flux density is termed the $t_{10}$ value, and is the value reported to characterize the stability of the member being tested. Since the rate of degradation of magnetic properties is generally slow at normal room conditions, it is usually desirable to accelerate the test by aging the members at elevated temperature and humidity, e.g., 65° C. and 50% RH. Experience has shown that one day of aging under these conditions produces degradation equivalent to that found after about one year of aging under normal storage conditions.

The invention will be further explained by the following examples, which are intended to be illustrative and not limiting. The chromium dioxide used in these examples was prepared according to Cox U.S. Patent 3,278,263 and was further made ready by grinding with a mortar and pestle to break up agglomerates and insure uniform fine particle size. In all cases, stability test data are for samples subjected to accelerated aging conditions; specifically, the $t_{10}$ value for a given sample shows that that sample lost 10% of its initial residual intrinsic flux density ($\Delta\phi_r = -10\%$) after storage for the indicated number of days at 65° C., 50% RH.

EXAMPLES I–III

These examples illustrate magnetic recording members of the present invention. For each, in a glass bottle with a capacity of about 240 ml. were placed:

(a) 21 g. of tetrahydrofuran,
(b) 12 g. of chromium dioxide,
(c) 0.48 g. (4% on the weight of the $CrO_2$) of an organophosphorus compound as identified in Table 1,
(d) 30 ml. of 20–30 mesh washed Ottawa sand.

The bottle was capped and the ingredients were slurry-milled for 1.5 hours by shaking the bottle in a commercial paint conditioning machine operating at about 720 cycles per minute. To the contents of the jar were then added:

(e) 1.94 g. dry basis (12.9 g. of a 15% by weight solution in tetrahydrofuran) of a commercially available polyester-polyurethane resin from 1,4-butanediol, adipic acid, and diphenylmethane diisocyanate,
(f) 1.89 g. dry basis (6.3 g. of a 30% by weight solution in methyl isobutyl ketone) of a commercially available vinylidene chloride/acrylonitrile (80/20) copolymer,
(g) 30 ml. of 20–30 mesh washed Ottawa sand.

The bottle was again capped and shaken for one hour on the paint conditioning shaker as before. There were then added:

(h) 0.05 g. of a commercially available stearamide lubricant,
(i) 0.3 g. dry basis (1.5 g. of a 20% by weight solution in 6/1-tetrahydrofuran/methyl ethyl ketone) of a polyfunctional curing agent, 2,4-toluene diisocyanate/trimethylolpropane (3/1).

The mixture was then shaken for one hour as before, diluted with 5 ml. of tetrahydrofuran, and shaken an additional five minutes. It was then filtered through a cloth pad supported on a metal screen having a 2-micron filter rating. The viscosity of the filtrate was measured to be 8.4 poises (No. 4 spindle, Brookfield Viscometer, 50 r.p.m.).

For comparative purposes, a prior art composition identified in Table 1 as Control A was made up by the same procedure. In place of the organophosphorus stabilizers of Examples I–III, Control A contained 0.48 g. (4% on the weight of the $CrO_2$) of a commercially available soya lecithin wetting agent commonly used in magnetic tape compositions. It also contained 0.03 g. of stearamide lubricant (vs. 0.05 g. in Examples I–III) and 0.02 ml. of amyl alcohol.

Each of the dispersions thus prepared was spread by means of a doctor knife set at a clearance of 0.003 inch on a 0.0015-inch-thick commercial polyethylene terephthalate film base. While still wet, the film was passed between opposing magnets having an orienting magnetic field of about 900 gauss to align the chromium dioxide particles. The oriented layer was then dried overnight at room temperature. The dry layer was calendered with one pass between a cotton-filled roll and a polished chrome-plated steel roll having its surface at a temperature of about 105° C. at a pressure of 1000–1200 lbs. per linear inch, with the coated side of the film in contact with the polished roll. The approximate composition of the dry magnetic coating, exclusive of the polyethylene terephthalate supporting film, was 72% chromium dioxide and 28% total binder. In each instance, the organophosphorus stabilizer (in the case of Control A, the soya lecithin) comprised 2.88% by weight of the total dry coating. Each of the magnetic recording members thus prepared exhibited good general magnetic properties characteristic of coatings containing ferromagnetic chromium dioxide of the patents listed above. Residual intrinsic flux density, $\phi_r$, was determined initially and after aging at 65° C., 50% RH. The $t_{10}$ values in Table 1 illustrate the advantage of including an organophosphorus stabilizer according to this invention.

TABLE 1

| Example | Stabilizer | $t_{10}$ (days) |
|---|---|---|
| Control A | None | 3.1 |
| I | dioctyl phenyl phosphonate, $(C_8H_{17}O)_2P(O)(C_6H_5)$. | 6.4 |
| II | Sodium capryl tripolyphosphate, a commercially available product said to have the formula $Na_5[CH_3(CH_2)_5CH(CH_3)]_5(P_3O_{10})_2$. | 7.0 |
| III | Triphenyl phosphine oxide, $(C_6H_5)_3PO$ | 10.5 |

EXAMPLE IV

By conventional means known to those skilled in the polymer art, there was prepared a copolymer containing 94% methyl methacrylate and 6% dimethyl allyl phosphonate, $(CH_3O)_2P(O)CH_2CH{:}CH_2$, having an inherent viscosity of 0.25 (0.5% solution in $CHCl_3$ at 25° C.). This copolymer was combined to the extent of 0.72 g. dry basis (4.8 g. of a 15% by weight solution in tetrahydrofuran) with the following quantities (dry basis) of the indicated ingredients of Example I:

| | G. |
|---|---|
| Chromium dioxide | 12.0 |
| Polyester-polyurethane resin | 2.54 |
| Vinylidene chloride/acrylonitrile polymer | 1.09 |
| Curing agent | 0.3 |
| Stearamide lubricant | 0.05 |

by the procedures of Example I to form a magnetic recording member of this invention. The composition of the dry magnetic coating, exclusive of the polyethylene terephthalate suporting film, was 72% chromium dioxide and 28% total binder. The polymeric organophosphorus stabilizer was present to the extent of 6% by weight of the chromium dioxide, and constituted 4.31% by weight of the magnetic coating. When tested for stability, this member was found to have a $t_{10}$ of 6.9 days, significantly better than the value for the unstabilized composition of Control A.

EXAMPLE V

The stabilizer of Example IV and the general procedures of Example I were used to make the following composition:

(a) 12 g. chromium dioxide,
(b) 1.89 g. dry basis (12.6 g. of 15% by weight solution in tetrahydrofuran) of polyesterpolyurethane resin,
(c) 2.79 g. dry basis (9.3 g. of 30% by weight solution in tetrahydrofuran) of vinylidene chloride/acrylonitrile polymer,
(d) 0.48 g. dry basis (3.2 g. of 15% by weight solution in tetrahydrofuran) of the polymeric organophosphorus stabilizer of Example IV.

The composition of the dry final coating was 69.9% chromium dioxide and 30.1% total binder. The organophosphrous stabilizer was present to the extent of 4% by weight of the chromium dioxide and constituted 2.8% by weight of the total dry coating. After accelerated aging as before, this composition had a $t_{10}$ value of 18.0 days.

EXAMPLES VI–VIII

These examples show several polymeric organophosphorus stabilizers in a binder system that omits the vinylidene chloride/acrylonitrile polymer used in all the preceding examples. The stabilizers identified in Table 2 were made by conventional procedures known to those familiar with polymerization techniques. Each of the examples was made up by the general procedure of Example I to the following composition (dry basis):

| | G. |
|---|---|
| (a) Chromium dioxide | 12 |
| (b) Polyester-polyurethane resin | 3.21 |
| (c) Polyfunctional curing agent of Example I | 0.14 |
| (d) Stearamide lubricant | 0.05 |
| (e) Stabilizer (7% on weight of $CrO_2$) | 0.84 |

and was made into a magnetic recording member by the procedure of Example I and tested for stability as before, with the results shown in Table 2. For each of these examples, the composition of the dry final coating was 73.9% chromium dioxide and 26.1% total binder. The polymeric organophosphorus stabilizer constituted 5.17% by weight of the total dry coating.

TABLE 2

| Example | Stabilizer | $t_{10}$ (days) |
|---|---|---|
| VI | 94/6-methyl methacrylate/dimethylallyl phosphonate copolymer of Example V. | 10.0 |
| VII | 89/11-methyl methacrylate/bis-(2-chloroethyl) vinyl phosphonate copolymer having an inherent viscosity of 0.14 (0.5% solution in $CHCl_3$ at 25° C.). The formula of the phosphonate monomer is $[CH_2(Cl)CH_2O]_2P(O)CH{:}CH_2$. | 10.8 |
| VIII | 82/18-styrene/bis(2-chloroethyl)vinyl phosphonate copolymer having an inherent viscosity of 0.18 (0.5% solution in $CHCl_3$ at 25° C.). | 7.3 |

EXAMPLES IX–XIX

By the general procedure of Example I, a number of compositions were prepared, made into magnetic recording members, and tested for stability. The nominal formulation (dry basis) for these compositions was:

| | Parts |
|---|---|
| (a) Chromium dioxide | 4 |
| (b) Polyester-polyurethane resin | 0.62 |
| (c) Vinylidene chloride/acrylonitrile polymer | 0.93 |
| (d) (4% on weight of $CrO_2$) organophosphorus stabilizer | 0.16 |

The composition by weight of the dry magnetic coatings was thus approximately 70% chromium dioxide and 30% total binder, and the organophosphorus stabilizers constituted approximately 2.8% by weight of the total dry coating. Control B, a prior art composition, contained no dispersing agent and no stabilizer. Control C, also a prior art composition, contained, 0.16 part by weight (4% by weight on the $CrO_2$) of the soya lecithin dispersing agent of Control A, but no stabilizer. The stabilizers used in the remaining examples and the results of the stability test for all examples are shown in Table 3.

From the foregoing examples, it will be seen that magnetic recording members containing organophosphorus compounds as stabilizers according to this invention have significantly better stability of their magnetic properties as compared with prior art members that do not contain the stabilizers of this invention. Magnetic recording members made as described herein are of high quality and exceptional stability and are suitable for any of the uses where magnetic recording is employed, e.g., audio and television recording, instrumentation and computer applications, and various types of control equipment. The improved stability characteristic of the magnetic recording members of this invention makes them particularly useful in applications where the recording member is to be stored for long periods of time under conditions of high temperature and high humidity.

The embodiments of the invention in which an exclusive property or privilege is claimed are defined as follows:

1. A stabilized ferromagnetic chromium dioxide composition comprising:

(a) fine, acicular ferromagnetic chromium dioxide particles, (b) a stabilizing amount of an organophosphorus compound having no —OH group attached to a P atom and taken from the group consisting of phosphines, phosphine oxides, and organic esters of phosphorus acids and their univalent metal salts, and (c) a macromolecular, film-forming organic polymer binding agent.

2. A composition according to claim 1 containing (d) a volatile organic solvent for constituents (b) and (c).

3. A composition according to claim 1 in the form of a film or layer.

4. A composition according to claim 1, wherein the phosphorus compound is triphenyl phosphine.

5. A compound according to claim 1, wherein the phosphorus compound is triphenyl phosphine oxide.

6. A composition according to claim 1, wherein the phosphorus compound is sodium capryl tripolyphosphate.

7. A composition according to claim 1, wherein the organophosphorus compound is an addition copolymer of an ethylenically unsaturated monomer free from organophosphorus and an ethylenically unsaturated monomeric ester of a phosphorus acid or a univalent metal salt thereof.

8. A composition according to claim 7, wherein said copolymer is a methyl methacrylate/dimethyl allyl phosphonate copolymer.

TABLE 3

| Example | Stabilizer | $t_{10}$ (days) |
|---|---|---|
| Control B | None; prior art composition | 3.7 |
| Control C | None; prior art composition containing soya lecithin dispersing agent | 1.6 |
| IX | Sodium 2-ethylhexyl tripolyphosphate; a commercially available product said to have the formula $Na_5[CH_3(CH_2)_3CH(C_2H_5)CH_2]_5(P_3O_{10})_2$. | 5.0 |
| X | Triphenyl phosphate, $(C_6H_5O)_3PO$ | 4.3 |
| XI | Triphenyl phosphite, $(C_6H_5O)_3P$ | 6.8 |
| XII | Sodium capryl tripolyphosphate of Example III | 7.4 |
| XIII | Triphenyl phosphine oxide, $(C_6H_5)_3PO$ | 7.0 |
| XIV | Trilauryl phosphite, $(C_{12}H_{25}O)_3P$ | 6.0 |
| XV | Triphenyl phosphine, $(C_6H_5)_3P$ | 7.4 |
| XVI | Commercially available polymeric phosphite (average molecular weight of 1,100) having the repeating unit: 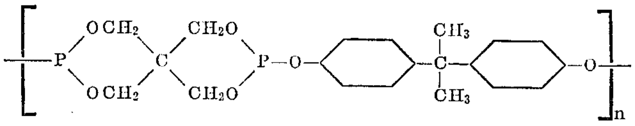 from 2,2-bis(4-hydroxyphenyl) propane (Bisphenol A) and pentaerythritol phosphite. | 8.7 |
| XVII | Diphenyl phenyl phosphonate, $(C_6H_5O)_2P)O)(C_6H_5)$ | 8.0 |
| XVIII | Sodium benzene phosphinate, $C_6H_5(H)P(O)(ONa)$ | 7.8 |
| XIX | Diphenyl decyl phosphite, $(C_6H_5O)_2P(OC_{10}H_{21})$ | 3.7 |

9. A composition according to claim 7, wherein said copolymer is a methyl methacrylate/bis-(2-chloroethyl)-vinyl phosphonate copolymer.

10. A process of making ferromagnetic chromium dioxide composition comprising fine acicular ferromagnetic chromium dioxide particles and a macromolecular organic polymer binder, characterized in that there is incorporated with the particles and binder a stablizing amount of an organophosphorus compound having no —OH group attached to a P atom and taken from the group consisting of phosphines, phosphine oxides, organo esters of phosphorus acids, and the univalent metal salts of said esters.

References Cited

UNITED STATES PATENTS

| | | | |
|---|---|---|---|
| 2,864,771 | 12/1958 | Switzer et al. | 252—301.3 |
| 3,080,319 | 3/1963 | Arrington | 252—62.54 |
| 3,512,930 | 5/1970 | Bottjer et al. | 23—145 |

TOBIAS E. LEVOW, Primary Examiner

A. P. DEMERS, Assistant Examiner

U.S. Cl. X.R.

117—234, 235; 252—62.51, 62.53.